United States Patent [19]

Sato

[11] 4,384,555
[45] May 24, 1983

[54] CAP FOR LARGER END PORTION OF CONNECTING ROD OF TWO-STROKE INTERNAL COMBUSTION ENGINE

[75] Inventor: Yutaka Sato, Fukuroi, Japan

[73] Assignee: Yamaha Hatsudoki Kabushiki Kaisha, Iwata, Japan

[21] Appl. No.: 300,119

[22] Filed: Sep. 8, 1981

[30] Foreign Application Priority Data

Oct. 28, 1980 [JP] Japan ................... 55-150200

[51] Int. Cl.³ ........................................... F02B 75/32
[52] U.S. Cl. ............................ 123/197 AC; 308/23; 123/41.34; 123/196 R
[58] Field of Search .............. 123/197 AB, 197 AC, 123/41.35, 41.34, 196 R; 308/187, 179, 23, 203

[56] References Cited

U.S. PATENT DOCUMENTS

| | | | |
|---|---|---|---|
| Re. 18,080 | 5/1931 | Götz | 308/179 |
| 1,352,460 | 9/1920 | Konyuka | 123/41.35 |
| 1,773,877 | 8/1930 | Severin | 308/23 |
| 1,837,825 | 12/1931 | Mead | 308/23 |
| 2,239,834 | 4/1941 | Williams | 308/23 |
| 4,142,484 | 3/1979 | Buhl | 123/41.35 |

Primary Examiner—Charles J. Myhre
Assistant Examiner—E. Rollins Cross
Attorney, Agent, or Firm—Freilich, Hornbaker, Wasserman, Rosen & Fernandez

[57] ABSTRACT

An internal combustion engine having a connecting rod (7) secured to a crankshaft (5) over a bearing (6) by a cap (1), holes in the cap for lubricating the cap side of the connecting rod are improved by providing for at least two holes ($A_2$, $A_3$) a trapping groove extending from the hole in the direction of rotation (R) of said crankshaft, and a wall surface ($D_2$, $D_3$) parallel to the axis of the hole. In one embodiment the axis of the improved lubricating holes through the cap are disposed along radii of said crankshaft. In another embodiment the axis of each improved lubricating hole is canted a small angle ($\theta$) to tilt the inlet of the hole in the direction of rotation.

4 Claims, 4 Drawing Figures

CAP FOR LARGER END PORTION OF CONNECTING ROD OF TWO-STROKE INTERNAL COMBUSTION ENGINE

BACKGROUND OF THE INVENTION

This invention relates to an internal combustion engine, and more particularly to lubrication and cooling of the cap side of the larger end portion of a connecting rod, i.e., the end portion connected to the crankshaft, in engines of the type which do not employ a pressurized lubricating system, such as in a small two-stroke outboard engine.

As the r.p.m. of an internal combustion engine is increased, there is observed a phenomenon that the temperature at the cap side of the larger end portion of the connecting rod becomes remarkably higher than that at the rod side. As a result, separation takes place between the bearing and the crankshaft on the cap side. That separation exerts influences to other members, thereby to raise one of the causes for shortening the lifetime of the internal combustion engine. In order to cope with this phenomenon, therefore, the cap is formed with radial lubricating holes through which lubricant from the crankcase is directed between the bearing and the crankshaft, thereby to improve lubrication and cooling. That lubricating hole is conically countersunk, as if to receive a screw, but even such an enlarged inlet to the lubrication hole can hardly trap the lubricant to a sufficient extent as the r.p.m. of the engine is increased. As a consequence, the temperature rise at the cap side cannot always be restrained.

OBJECTS AND SUMMARY OF THE INVENTION

An object of this invention is to provide one or more improved lubricating holes at the cap side of the larger end portion of a connecting rod of an internal combustion engine. This is accomplished by a trap groove formed on the outside of said cap at the inlet of one or more lubricating holes. The trap grooves extend from the holes in the direction of motion of the cap as the crank shaft is rotated by the connecting rod as it is driven by a piston. The axes of the holes are normally along radii of the crankshaft, and the trap grooves are normal to the lubricating holes. In a further improvement, the axis of each lubricating hole is canted a small angle in the direction of motion.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
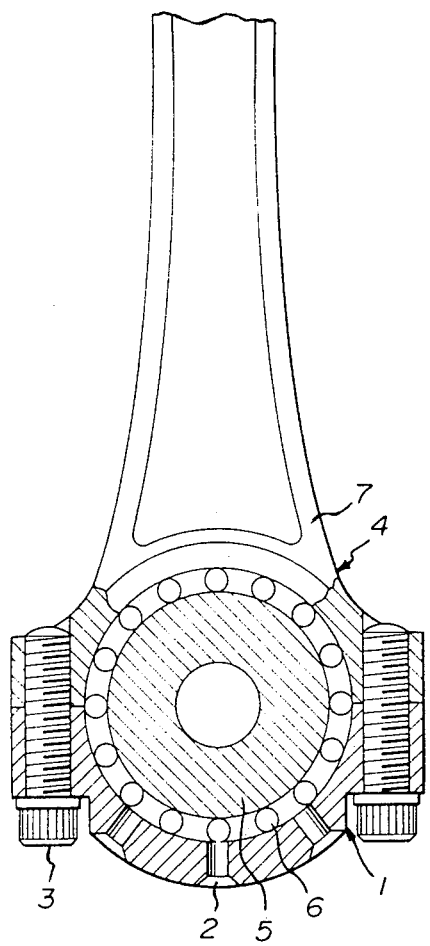
FIG. 1 illustrates the larger end portion of a connecting rod for a two-stroke internal combustion engine with conventional lubricating holes in the end cap according to the prior art.

Referring now to FIG. 1 of the drawings, there is shown a cap 1 with radial lubricating holes 2 according to the prior art. Bolts 3 attach the cap to an enlarged portion 4 of a connecting rod 7 to secure it on a crankshaft 5 with bearings 6 in between. A piston (not shown) at the other end of the connecting rod operates in a cylinder and transmits power to the crankshaft 5. In a small engine of the type which does not employ a pressurized lubricating system for the bearings 6, such as in a small two-stroke outboard engine, the bearings are lubricated through the holes 2 which are conically beveled (as if to receive a flat-head screw) in order to increase the amount of lubricant forced into holes from the crankcase (not shown) when the crankshaft rotates clockwise (as viewed in FIG. 1) in a circular path indicated by a dashed line. As the crankshaft moves through bottom dead center, lubricant in the crankcase is forced up through the holes into the bearings.

Figure 2B:
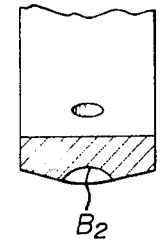
FIG. 2(B) is a section taken along a line M—M in FIG. 2(A).
Figure 2A:
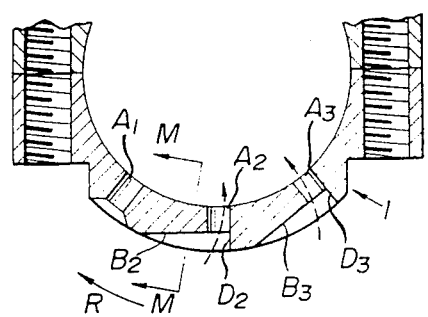
FIG. 2(A) illustrates improved lubricating holes for the end cap shown in FIG. 1.

Referring now to FIG. 2(A) which shows an embodiment of the present invention, radial lubricating holes $A_1$, $A_2$ and $A_3$ are provided, but only the hole $A_1$ is countersunk as in the prior art. The remaining holes $A_2$ and $A_3$ are instead provided with trap grooves $B_2$ and $B_3$ in the rotational direction R. The lubricant impinges the wall surfaces $D_2$ and $D_3$ of the holes $A_2$ and $A_3$ and is forced inwardly to the bearings (not shown), as indicated by dotted lines. These wall surfaces $D_2$ and $D_3$ are parallel to the radial axes of the holes $A_2$ and $A_3$. A back wall to the trap grooves is thus provided to scoop the lubricant up into the holes.

FIG. 2(B) shows in a section taken along a line M—M in FIG. 2(A) the curved shape of the groove $B_2$. That shape can be arbitrarily selected.

Figure 2C:
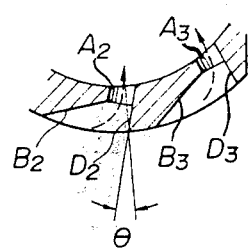
FIG. 2(C) is a variation of the improved lubricating holes shown in FIG. 2(A).

FIG. 2(C) shows another embodiment in which the guide holes $A_2$ and $A_3$, and the wall surfaces $D_2$ and $D_3$, are canted clockwise at an angle from the radial position, thereby to tile the inlet of the holes into the direction of rotation. According to this embodiment, it is possible to satisfactorily perform the introduction of the lubricant into the holes more easily and to minimize splashing of the lubricant by the centrifugal force.

It is evident that with the present invention thus far described, it is possible not only to improve the lubrication of the cap side of the larger end portion of the connecting rod and effect the desired cooling of the cap but also to cool the bearing and the crankshaft, thereby to make the temperature of these components uniform. As a result, separation may take place between the crankshaft and the bearing at the cap side, but smooth operation of the engine can be maintained so that its lifetime can be prolonged.

Although the lubricating holes $A_1$ in the present invention are conically countersunk as in the prior art, it should be noted that even that hole can be shaped with trap grooves and wall surfaces according to the first or second embodiment. Consequently, it is intended that the claims be interpreted to include that and other modifications suggested hereinabove, and equivalents thereof.

What is claimed is:

1. In an internal combustion engine having a connecting rod secured to a crankshaft by a cap over a bearing, said cap having lubricating holes in said cap, an improved means for lubricating said bearing comprising a trapping groove in said cap extending from at least one lubricating hole in the direction of rotation of said crankshaft, said trapping groove terminating at said lubricating hole, thereby leaving a wall at the far side of said hole from said trapping groove that is parallel to the axis of said lubricating hole.

2. An improved means as defined in claim 1 wherein the axis of said lubricating hole through said cap is disposed along a radius of said crankshaft.

3. An improved means as defined in claim 2 wherein the axis of said lubricating hole through said cpa is canted to tilt the inlet of the lubricating hole at a small angle in the direction of rotation of said crankshaft.

4. An improved means as defined in claim 1, 2 or 3 wherein at least two lubricating holes are similarly provided with trapping grooves.

* * * * *